United States Patent
Cywinski et al.

(10) Patent No.: US 11,906,883 B2
(45) Date of Patent: Feb. 20, 2024

(54) HOLDER BASE PART FOR SECURING AT LEAST ONE CAMERA HOUSING TO A VEHICLE PART OF A VEHICLE, CAMERA HOUSING AND CAMERA SYSTEM

(71) Applicant: Valeo Schalter und Sensoren GmbH, Bietigheim-Bissingen (DE)

(72) Inventors: Thorsten Cywinski, Bietigheim-Bissingen (DE); Raviraj Choure, Bietigheim-Bissingen (DE); Kai Elmering, Bietigheim-Bissingen (DE); Bernd Biehlman, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 236 days.

(21) Appl. No.: 17/600,776

(22) PCT Filed: Mar. 30, 2020

(86) PCT No.: PCT/EP2020/058887
§ 371 (c)(1),
(2) Date: Oct. 1, 2021

(87) PCT Pub. No.: WO2020/201175
PCT Pub. Date: Oct. 8, 2020

(65) Prior Publication Data
US 2022/0179294 A1    Jun. 9, 2022

(30) Foreign Application Priority Data
Apr. 4, 2019   (DE) .................. 10 2019 108 882.8

(51) Int. Cl.
*G03B 17/56* (2021.01)
*B60R 11/04* (2006.01)
*B60R 11/00* (2006.01)

(52) U.S. Cl.
CPC ............ *G03B 17/561* (2013.01); *B60R 11/04* (2013.01); *B60R 2011/0026* (2013.01)

(58) Field of Classification Search
None
See application file for complete search history.

(56) References Cited

U.S. PATENT DOCUMENTS 10,086,773 B2 * 10/2018 Okuda ................. B60R 11/04
10,556,553 B2 *  2/2020 Kasarla ................ H04N 23/57
(Continued)

FOREIGN PATENT DOCUMENTS

AU    2014411696 A1    6/2017
CN    1277583 A       12/2000
(Continued)

OTHER PUBLICATIONS

International Search Report and Written Opinion in corresponding International Application No. PCT/EP2020/058887, dated Jul. 7, 2020 (11 pages).
(Continued)

*Primary Examiner* — Rodney E Fuller
(74) *Attorney, Agent, or Firm* — Osha Bergman Watanabe & Burton LLP (57) ABSTRACT

A holder base part for securing at least one camera housing to a vehicle part of a vehicle, a camera housing and a camera system are described. The holder base part has a retaining element with a securing portion, by which the retaining element is secured to the vehicle part, and which has a retaining portion by which the retaining element is separably connected to a connection element on the side of the at least (Continued)

one camera housing by a sliding movement along a notional connection axis. The retaining portion contributes to defining an insertion region into which the housing-side connection element is inserted for separable connection to the retaining element. The retaining element has a holder-locking element which interacts with a housing-locking element on the side of the camera housing to lock a connection between the retaining element and the connection element. The holder-locking element is arranged in the insertion region.

16 Claims, 5 Drawing Sheets

(56) References Cited

U.S. PATENT DOCUMENTS

| | | | | |
|---|---|---|---|---|
| 10,921,166 | B2* | 2/2021 | Matori | G03B 17/561 |
| 11,433,827 | B2* | 9/2022 | Singh | B60R 11/04 |
| 2012/0099849 | A1 | 4/2012 | Onishi et al. | |
| 2015/0042804 | A1 | 2/2015 | Okuda | |
| 2016/0009230 | A1* | 1/2016 | Miyado | B60R 11/04 |
| | | | | 224/482 |
| 2016/0023620 | A1* | 1/2016 | Matori | G03B 11/045 |
| | | | | 348/148 |
| 2016/0216595 | A1 | 7/2016 | Carlson | |
| 2017/0240120 | A1* | 8/2017 | Krug | F16M 13/02 |
| 2017/0274835 | A1* | 9/2017 | Kasai | H04N 23/51 |
| 2018/0284398 | A1* | 10/2018 | Furutake | H04N 23/73 |
| 2019/0308563 | A1* | 10/2019 | Fujiwara | G03B 17/561 |
| 2019/0315289 | A1* | 10/2019 | Okuda | B60R 11/04 |
| 2022/0121091 | A1* | 4/2022 | Oba | F16B 2/20 |

FOREIGN PATENT DOCUMENTS

| | | |
|---|---|---|
| CN | 102452363 A | 5/2012 |
| CN | 103702868 A | 4/2014 |
| CN | 105292009 A | 2/2016 |
| CN | 106660491 A | 5/2017 |
| CN | 108397748 A | 8/2018 |
| DE | 202017104834 U1 | 9/2017 |
| EP | 2965949 A1 | 1/2016 |
| EP | 3144725 A2 | 3/2017 |
| EP | 3258119 A1 | 12/2017 |
| JP | 2012-91597 A | 5/2012 |
| JP | 2016-16830 A | 2/2016 |
| JP | 2017-523088 A | 8/2017 |
| WO | 2016/023621 A1 | 2/2016 |
| WO | 2016/078725 A1 | 5/2016 |

OTHER PUBLICATIONS

German Search Report issued in corresponding German Application No. 10 2019 108 882.8, dated Nov. 6, 2019 (5 pages).
Notification of Reason for Rejection issued in Japanese Patent Application No. 2021-558915, dated Oct. 28, 2022 (14 pages).
Office Action issued in Chinese Application No. 202080038219.4 dated May 19, 2023 (25 pages).

* cited by examiner

HOLDER BASE PART FOR SECURING AT LEAST ONE CAMERA HOUSING TO A VEHICLE PART OF A VEHICLE, CAMERA HOUSING AND CAMERA SYSTEM

TECHNICAL FIELD

The invention relates to a holder base part for securing at least one camera housing to a vehicle part of a vehicle, comprising at least one retaining element which has at least one securing portion, by which the at least one retaining element can be directly or indirectly secured to the vehicle part, and which has at least one retaining portion by which the at least one retaining element can be separably connected to at least one connection element on the side of the at least one camera housing by means of a sliding movement along a notional connection axis.

The invention further relates to a camera housing comprising at least one connection element for separable connection by means of a sliding movement along a notional connection axis to at least one retaining element of a holder base part, by which the camera housing can be directly or indirectly secured to a vehicle part of a vehicle, at least one connection element having at least one housing-locking element which can interact with at least one holder-locking element on the side of the at least one retaining element in order to lock the connection between the at least one connection element and the at least one retaining element.

Moreover, the invention relates to a camera system for a vehicle for securing, comprising at least one camera housing and at least one holder base part by which the at least one camera housing can be secured to a vehicle part of the vehicle, the at least one camera housing being able to be separably connected to the at least one holder base part by means of a sliding movement along a notional connection axis.

PRIOR ART

US 2012/0099849 A1 discloses a structure for mounting a camera on a vehicle. The structure comprises a base which is secured to a vehicle body, a camera, a sliding mechanism which is configured in such a way that the camera can slide in a sliding direction in order to be releasably brought into engagement with the base, and a spring element which is configured to generate a compressive force in a direction perpendicular to the direction of movement between the base and the camera when engaged, by which the camera is held in relation to the base.

The invention addresses the problem of designing a holder base part, a camera housing and a camera system of the type mentioned at the outset by which the camera housing can be reliably mounted more easily even in vehicle parts having different designs, in particular having different inclinations.

DISCLOSURE OF THE INVENTION

In the case of the holder base part, this problem is solved according to the invention in that at least one retaining portion at least contributes to defining at least one insertion region into which the at least one housing-side connection element can be inserted for separable connection to the at least one retaining element, at least one retaining element has at least one holder-locking element which can interact with at least one housing-locking element on the side of the camera housing in order to lock a connection between the at least one retaining element and the at least one connection element, at least one holder-locking element being arranged in at least one insertion region.

According to the invention, at least one retaining portion has at least one insertion region for at least one housing-side connection element. At least one holder-locking element is arranged in at least one insertion region. In contrast with the structure known from the prior art, the at least one holder-locking element is thus accommodated in a protected and compact manner. The at least one housing-side connection element can have a simpler construction.

The holder base part is used to separably secure at least one camera housing to a vehicle part of a vehicle. In so doing, the holder base part can be rigidly connected to the vehicle part. For this purpose, the holder base part, in particular the at least one securing portion of the at least one retaining element, can be adhered to the vehicle part or otherwise secured thereto. The at least one camera housing can be separably connected to the holder base part by means of the separable connection of the at least one connection element to the at least one retaining element. As a whole, the holder base part can thus be adapted to different vehicle parts. The holder base part can act as a type of adapter for securing the at least one camera housing to the vehicle part.

The vehicle part can be mounted obliquely to a vehicle longitudinal axis. By means of the holder base part, an inclination of a vehicle part can be compensated in such a way that a camera axis can be oriented as required, in particular parallel to the vehicle longitudinal axis.

Advantageously, the vehicle part to which the holder base part is secured can be a vehicle window. The vehicle window can advantageously be a windshield or a rear window.

Advantageously, the holder base part, in particular at least one retaining element, can be produced in one piece. In this way, the holder base part, in particular the at least one retaining element, can have a more sturdy construction. No additional installation work is required to assemble different components.

Advantageously, the holder base part, in particular the at least one retaining element, can consist of plastics material, composite material, metal and/or a mixture of such materials or the like, or at least comprise such materials. The at least one retaining element can be produced in a simple manner, in particular injection-molded or cast, from plastics material.

The invention is used in a vehicle, in particular a motor vehicle. The invention can advantageously be used in a land-based vehicle, in particular a passenger vehicle, a truck, a bus, a motorcycle or the like, an aircraft and/or a watercraft. The invention can also be used in vehicles that can be operated autonomously or at least partially autonomously. However, the invention is not limited to vehicles. It can also be used in stationary operation.

The camera system can advantageously be connected to at least one electronic control device of the vehicle, in particular a driver assistance system and/or a chassis control system and/or a driver information device and/or a parking assistance system and/or a gesture recognition or the like or can be part of such a device or system. In this way, at least partially autonomous operation of the vehicle can be made possible.

In one advantageous embodiment, at least one holder-locking element can extend along a notional locking axis which runs transversely to the connection axis so that, in an end position of the connection, the at least one holder-locking element and the at least one housing-locking element can engage with one another along the locking axis. In this way, the at least one holder-locking element and the at least one housing-locking element can be moved relative to one another along the locking axis transversely to the connection axis for locking or to release the locking. A locking/unlocking force component along the locking axis which is required to lock or unlock can be directed transversely to an insertion/extraction force component, which is required to insert the at least one housing-side connection element into the at least one insertion region or to extract the connection element from this region. The force components required for locking/unlocking and the force components for insertion/extraction can thus be decoupled more easily.

In another advantageous embodiment, at least one holder-locking element can extend along a notional locking axis which runs transversely to a notional tensile axis of the at least one retaining portion on the at least one securing portion. In this way, a locking/unlocking force component along the locking axis, which must be applied for locking or unlocking, can be directed transversely to a retaining force component by which the camera housing is held on the holder base part. The force components required for locking/unlocking and the force components for holding the camera housing can thus be decoupled more easily.

The force components for holding the camera housing on the holder base part can be produced substantially by gravity.

In another advantageous embodiment, at least one holder-locking element can have or consist of at least one protrusion, and/or at least one holder-locking element can have or consist of at least one depression. In a corresponding manner, advantageously, at least one housing-locking element can have or consist of at least one depression, and/or at least one housing-locking element can have or consist of at least one protrusion. In this way, the at least one holder-locking element and a corresponding, in particular complementary, housing-locking element can engage with one another in an interlocking manner.

A protrusion can be produced in a simple manner, in particular as a stud, web, pin or the like. A depression can be produced simply as a notch, groove, hole or the like.

In another advantageous embodiment, at least one retaining portion can laterally define at least one insertion region when viewed in the direction of the connection axis, and/or at least one retaining portion can define at least one insertion region on the side opposite the at least one securing portion. A lateral definition can define a movement of the camera housing transversely to the connection axis and/or in the direction of a notional locking axis. By means of a definition on the side opposite the at least one securing portion, the weight of the at least one camera housing can be held on the holder base part.

Advantageously, at least one insertion region can be open to the side when viewed in the direction of the connection axis, and/or at least one insertion region can be open on an end face. Through an open end face, at least one housing-side connection element can be inserted in the insertion region. In the end position, the at least one housing-side connection element can protrude through a lateral opening.

Advantageously, at least one insertion region can be open to the side and on an end face when viewed in the direction of the connection axis.

In another advantageous embodiment, at least one retaining portion and/or at least one holder-locking element can be resiliently movable at least transversely to the connection axis. In this way, the at least one retaining portion and/or the at least one holder-locking element on the one hand, and at least one housing-side connection element on the other hand can be moved away from one another in the direction of the locking axis when inserting the at least one connection element into the at least one insertion region in order to provide space for the at least one holder-locking element and/or the at least one housing-locking element. As soon as the end position in which the at least one holder-locking element and the at least one housing-locking element engage with one another is reached, the at least one retaining portion and/or the at least one holder-locking element can assume the original shape thereof again.

Alternatively or additionally, at least one connection element can advantageously be resiliently movable transversely to the connection axis.

In another advantageous embodiment, at least one retaining element can have at least one stop which defines the at least one insertion region when viewed in the direction of insertion of the at least one housing-side connection element into the at least one insertion region. In this way, the at least one connection element can be prevented from being pushed beyond the end position thereof.

Advantageously, at least one stop and at least one retaining portion can be resiliently movable relative to one another. In this way, the at least one retaining portion can be resiliently moved separately from the at least one stop. In this way, the mounting can be simplified.

Advantageously, a separating slot can be defined between the at least one stop and the at least one retaining portion. In this way, the at least one stop and the at least one retaining portion can be resiliently moved separately from one another.

In another advantageous embodiment, at least one retaining element can have at least one guide element which is arranged on the side of the at least one insertion region which faces the at least one securing portion. By means of the at least one guide element, the at least one housing-side connection element can be guided when inserted into the at least one insertion region.

Advantageously, at least one retaining element can have at least one pressing-over region on an outer face. In the pressing-over region, the at least one retaining element can be elastically deformable. In this way, by means of a corresponding pressing region on the side of the at least one camera housing having the pressing-over region, a pressing-over can be produced. The connection of the at least one retaining element to the at least one connection element can thus be further stabilized.

Advantageously, at least one pressing-over region can be arranged on the securing portion. In this way, a corresponding housing-side pressing region can be supported against the pressing-over region and thus press the at least one housing-side connection element against part of the at least one retaining portion which defines the at least one insertion region on the side opposite the at least one securing portion.

Advantageously, the respective securing portions of at least two retaining elements can be interconnected by means of a common base-securing portion. In this way, the at least one camera housing can be held at different points.

Advantageously, the holder base part can have at least two retaining elements, the connection axes of which run in parallel. In this way, by means of a straight insertion movement along the connection axes, the camera housing can be connected to the holder base part.

As a result of the fact that the at least two retaining elements are interconnected on the same base-securing portion, these retaining elements can be secured to a vehicle part together. Furthermore, by means of the same base-securing portion, it is ensured that the orientations of and/or distances between the at least two retaining elements relative to one another can be permanently defined.

Advantageously, the securing portions of the retaining elements and of the base-securing portion can be produced as a single piece. The base-securing portion can thus simultaneously act as a respective securing portion for the corresponding retaining elements. The retaining elements can thus be secured to the vehicle part by means of the securing portions thereof and the base-securing portion.

In another advantageous embodiment, the respective securing portions of at least two retaining elements can be interconnected by means of a common base-securing portion in such a way that these portions are arranged one behind the other or obliquely one behind the other when viewed in the direction of the connection axes thereof. In this way, the retaining forces can be distributed to a plurality of points located one behind the other in order to hold the at least one camera housing on the holder base part.

Advantageously, two pairs each having at least two retaining elements located one behind the other or obliquely one behind the other can be arranged side-by-side. In this way, the camera housing can be held on the vehicle part at at least four points by means of the holder base part.

In another advantageous embodiment, the respective securing portions of least two retaining elements can be interconnected by means of a common base-securing portion in such a way that the connection axes thereof run parallel to one another at the same height when viewed from the base-securing portion, and/or the respective securing portions of at least two retaining elements can be interconnected by means of a common base-securing portion in such a way that the connection axes thereof run parallel to one another at different heights when viewed from the base-securing portion. In this way, an inclination of the vehicle part can be compensated overall by means of the holder base part in order to orient a camera axis.

Furthermore, in the case of the camera housing, the problem is solved according to the invention in that at least one connection element has at least one connecting wing which can be inserted into an insertion region of at least one retaining element on the side of the holder base part, at least one housing-locking element being arranged on the at least one connecting wing.

According to the invention, at least one housing-locking element is arranged on a connecting wing of a connection element. The at least one housing-locking element can be inserted together with the connecting wing into the insertion region of the at least one holder element. The at least one housing-locking element can thus interact with at least one holder-locking element of the at least one holder element. In this case, the at least one holder-locking element can be arranged in the at least one insertion region of the at least one holder element.

In one advantageous embodiment, at least one housing-locking element can extend along a notional locking axis which runs transversely to the connection axis of the at least one housing-side connection element into the at least one insertion region so that the at least one holder-locking element and the at least one housing-locking element can engage with one another along the locking axis. In this way, the at least one holder-locking element and the at least one housing-locking element can be moved relative to one another along the locking axis transversely to the connection axis for locking or to release the locking.

In one advantageous embodiment, at least one housing-locking element can have or consist of at least one depression, and/or at least one housing-locking element can have or consist of at least one protrusion. In this way, the at least one housing-locking element and a corresponding, in particular complementary, holder-locking element can engage with one another.

In a further advantageous embodiment, at least one connection element can have at least one pressing protrusion. By means of a pressing protrusion, a pressing-over can be produced by a corresponding elastically deformable rubber-fold region on the side of at least one retaining element. The connection between the at least one retaining element and the at least one connection element can thus be further stabilized.

Advantageously, at least one pressing protrusion can extend transversely to at least one connecting wing. In this way, by means of the pressing force which is produced by the pressing-over, the at least one connecting wing can be pressed against at least one retaining portion of the at least one retaining element. The connection can thus be further stabilized.

Advantageously, at least two connection elements can be arranged on the camera housing in such a way that the respective connection axes thereof run parallel to one another. In this way, the at least two connection elements can be inserted with a straight movement into the corresponding insertion regions of the corresponding retaining elements.

Advantageously, at least two connection elements can be arranged one behind the other or obliquely one behind the other when viewed in the direction of the connection axes thereof. In this way, a plurality of securing points can be produced on the same side of the at least one camera housing.

In another advantageous embodiment, at least two connection elements can be arranged on the camera housing in such a way that the connection axes thereof, when viewed from the side on which the holder base part is arranged, run parallel to one another at the same height, and/or at least two connection elements are arranged on the camera housing in such a way that the connection axes thereof, when viewed from the side on which the holder base part is arranged, run parallel to one another at different heights. In this way, an inclination of the vehicle part can be compensated overall by means of the holder base part in order to orient a camera axis.

In the case of the camera system, the problem is additionally solved according to the invention in that at least one holder base part has at least one retaining element according to the invention, and at least one camera housing has at least one connection element according to the invention.

Moreover, the features and advantages indicated in connection with the holder base part according to the invention, the camera housing according to the invention and the camera system according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which exemplary embodiments of the invention will be explained in greater detail with reference to the drawings. A person skilled in the art will also expediently consider the features that have been disclosed in combination in the drawings, the description and the claims individually and combine them to form further meaningful combinations.

In the drawings.

In the drawings, identical components are provided with the same reference numerals.

EMBODIMENT(S) OF THE INVENTION

Figure 1:
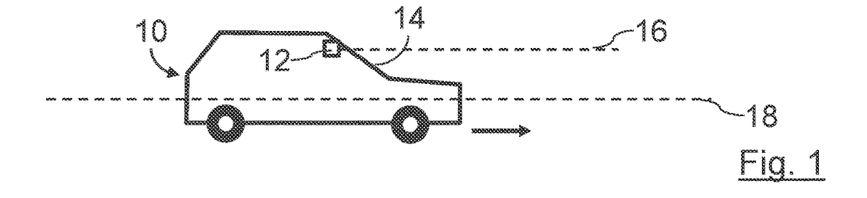
FIG. 1 is a schematic view of a motor vehicle comprising a camera system which is secured to a windshield of the motor vehicle.
Figure 2:
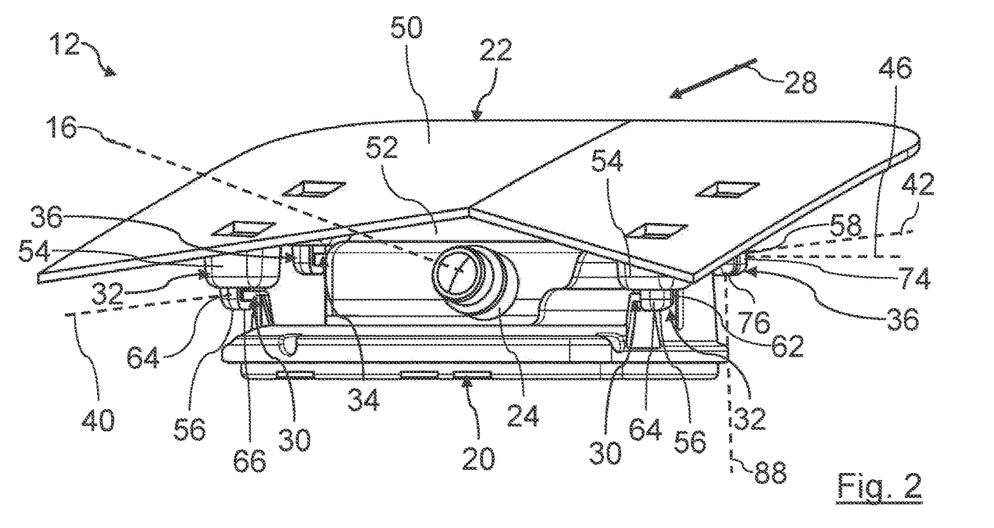
FIG. 2 is an isometric front view of the camera system from FIG. 1, comprising a camera housing and a holder base part, by which the camera housing is mounted on the windshield.
Figure 3:
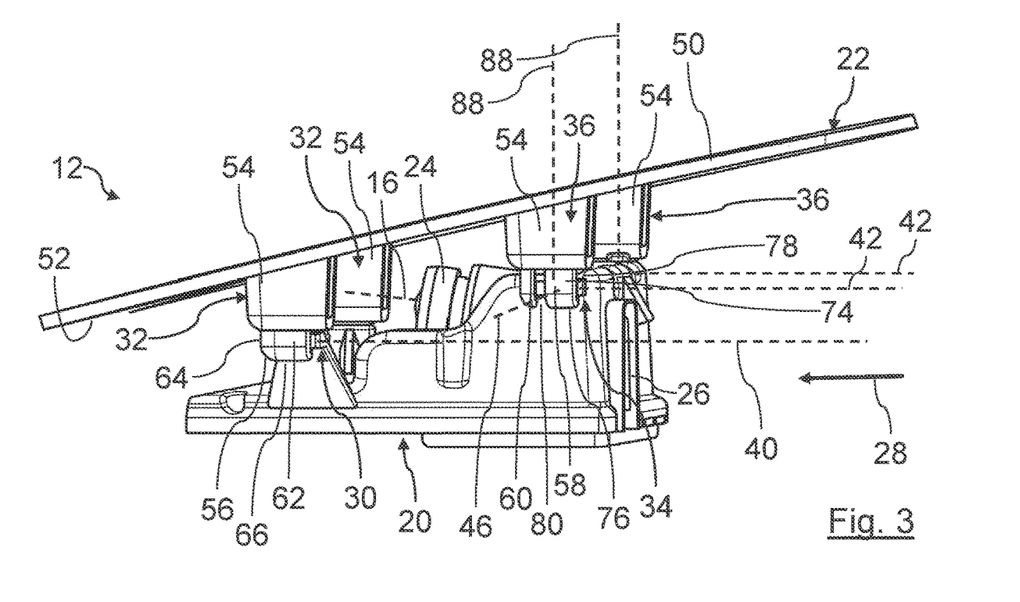
FIG. 3 is an oblique side view of the camera system from FIGS. 1 and 2.
Figure 4:
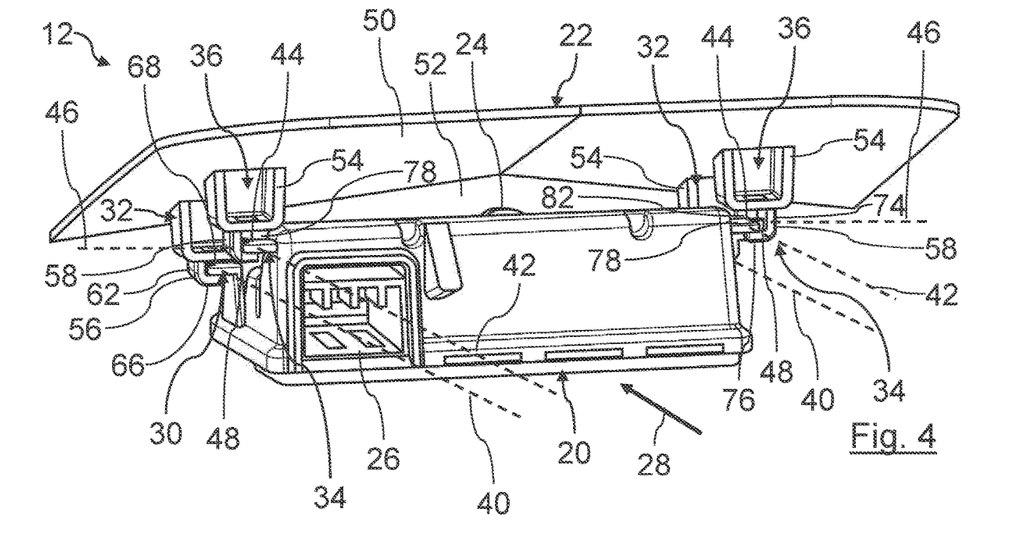
FIG. 4 is an oblique rear view of the camera system from FIGS. 1 to 3.
Figure 5:
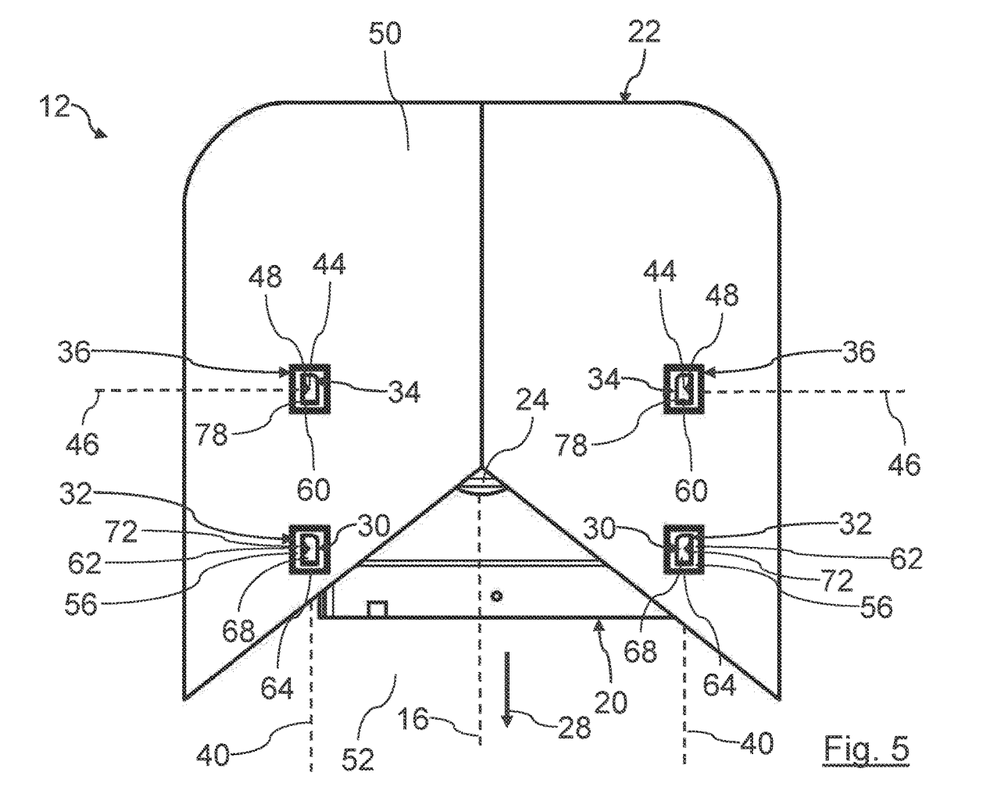
FIG. 5 is a top view of the camera system from FIGS. 1 to 4.
Figure 6:
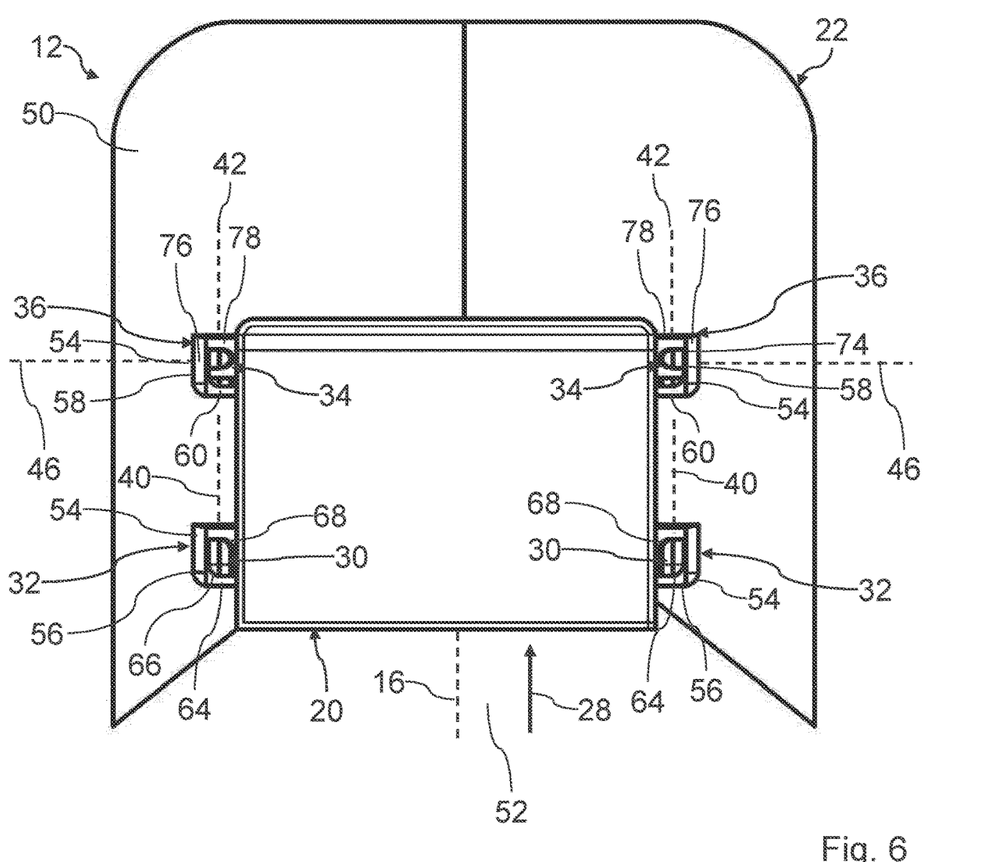
FIG. 6 is a view from below of the camera system from FIGS. 1 to 5.
Figure 7:
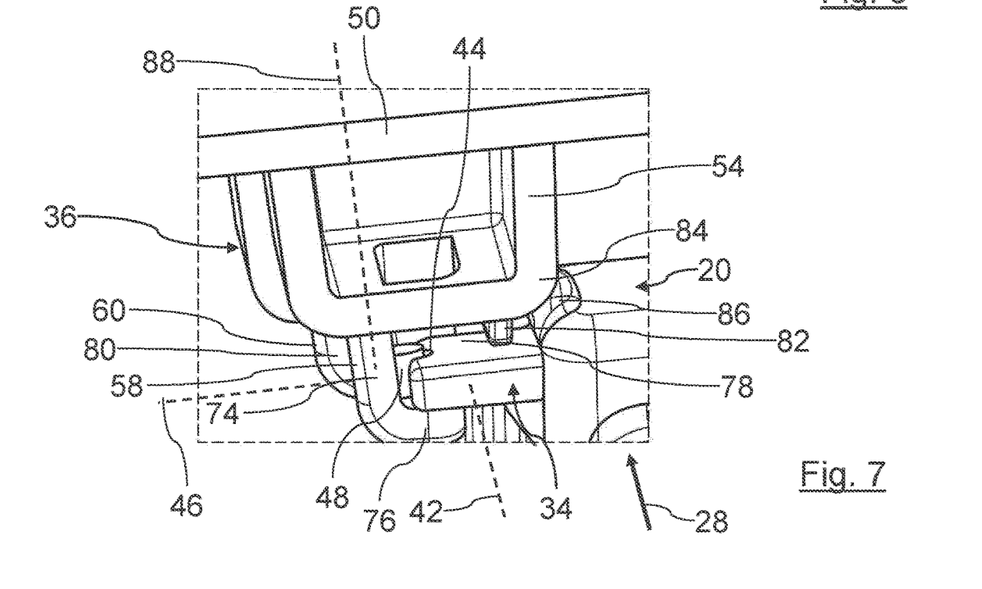
FIG. 7 is a first detailed view of the camera system from FIGS. 1 to 6 in the region of a rear retaining element of a holder base part and a rear connection element of a camera housing of the camera system on the vehicle window in a rear view.
Figures 8, 9, 10, 11:
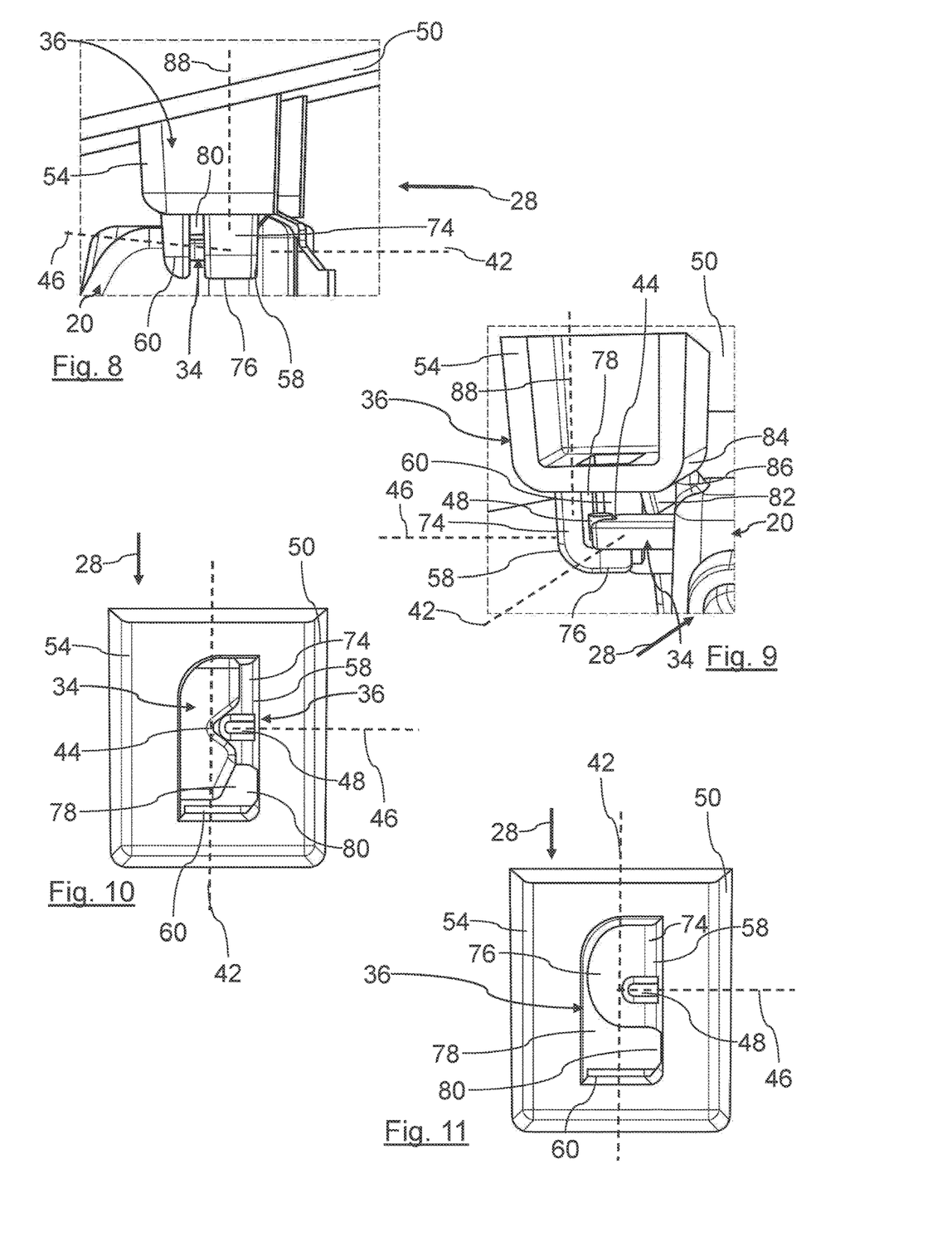
FIG. 8 is a second detailed view of the camera system from FIG. 7 in a side view.
FIG. 9 is a third detailed view of the camera system from FIG. 7 in a rear view.
FIG. 10 is a fourth detailed view of the camera system from FIG. 7 in a top view.
FIG. 11 is a detailed view of the holder base part of the camera system from FIGS. 1 to 10 in the region of a rear connection element in a top view.
Figure 12:
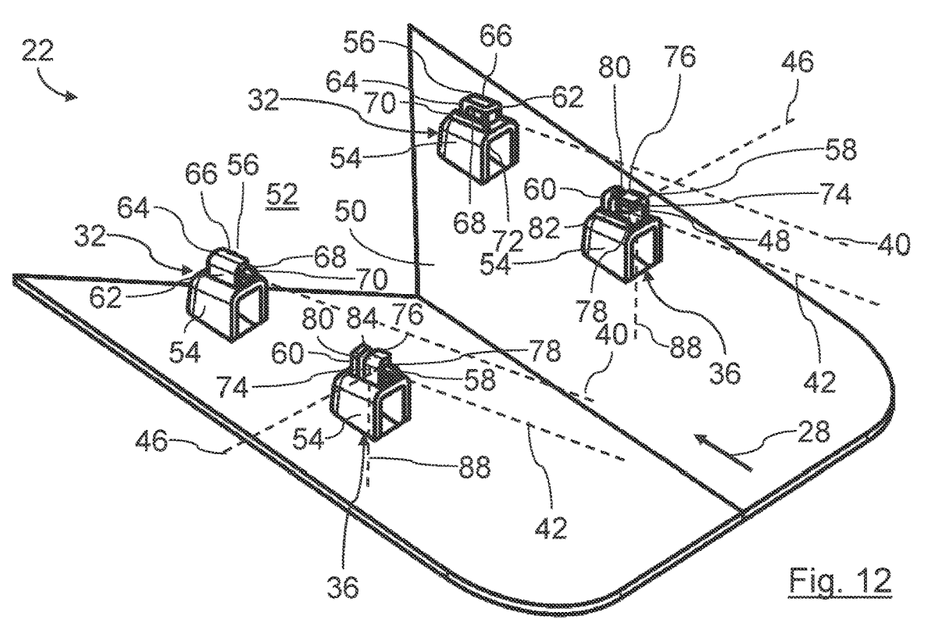
FIG. 12 is a view from below of the holder base part of the camera system from FIGS. 1 to 10.

FIG. 1 is a schematic view of a motor vehicle 10 for example in the form of a passenger vehicle. The motor vehicle 10 has a camera system 12. The camera system 12 is secured to a vehicle part, for example to an inner face of a highly inclined vehicle window 14, for example a windshield. A notional camera axis 16 of the camera system 12 is oriented for example parallel to a notional vehicle longitudinal axis 18.

The camera system 12 can be used to capture a monitoring region in front of the motor vehicle 10 in the driving direction of the motor vehicle 10. Instead of to the windshield, the camera system 12 can also be secured to another vehicle part of the motor vehicle 10, for example a rear window, a side window or to an inner face of a roof of the motor vehicle 10 and/or oriented in another direction.

In FIGS. 2 to 13, the camera system 12 is shown in different perspectives and detailed views.

The camera system 12 comprises a camera housing 20 and a holder base part 22. The camera housing 20 is secured to the vehicle window 14 by the holder base part 22.

The camera housing 20 contains a camera (which is of no further interest here), comprising a lens 24 on the front side. By way of example, a lens axis of the lens 24 corresponds to the camera axis 16. On the rear face, the camera housing 20 has an electrical connection plug 30. By means of the connection plug 30, electrical cables can be connected which lead to a control and evaluation unit of the motor vehicle 10, for example a driver assistance system.

When "front side", "rear side", "front", "rear" or the like is mentioned in the following, unless specified otherwise, this relates to a direction 28 of insertion of the camera housing 20 into the holder base part 22.

When "top", "bottom", "side", "laterally" or the like is mentioned in the following, unless specified otherwise, this relates to the mounting of the camera system 12 on the vehicle window 14, in which the camera system 12 is suspended spatially at the bottom of the inner face of the vehicle window 14. "Top" is accordingly the side of the camera system 12 which faces the vehicle window 14. "Bottom" is the side of the camera system 12 which faces away from the vehicle window 14.

The camera housing 20 has two front connection elements 30 on opposite sides with respect to the camera axis 16. By means of the front connection elements 30, the camera housing 20 is separably connected to the corresponding front retaining elements 32 of the holder base part 22.

The camera housing 20 further has two rear connection elements 34 on opposite sides with respect to the camera axis 16. By means of the rear connection elements 34, the camera housing 20 is separably connected to corresponding rear retaining elements 36 of the holder base part 22.

When viewed in the insertion direction 28, the rear connection elements 34 are each arranged behind the front connection elements 30. The connection elements 30 and 34 are shown for example in FIG. 13.

Figure 13:
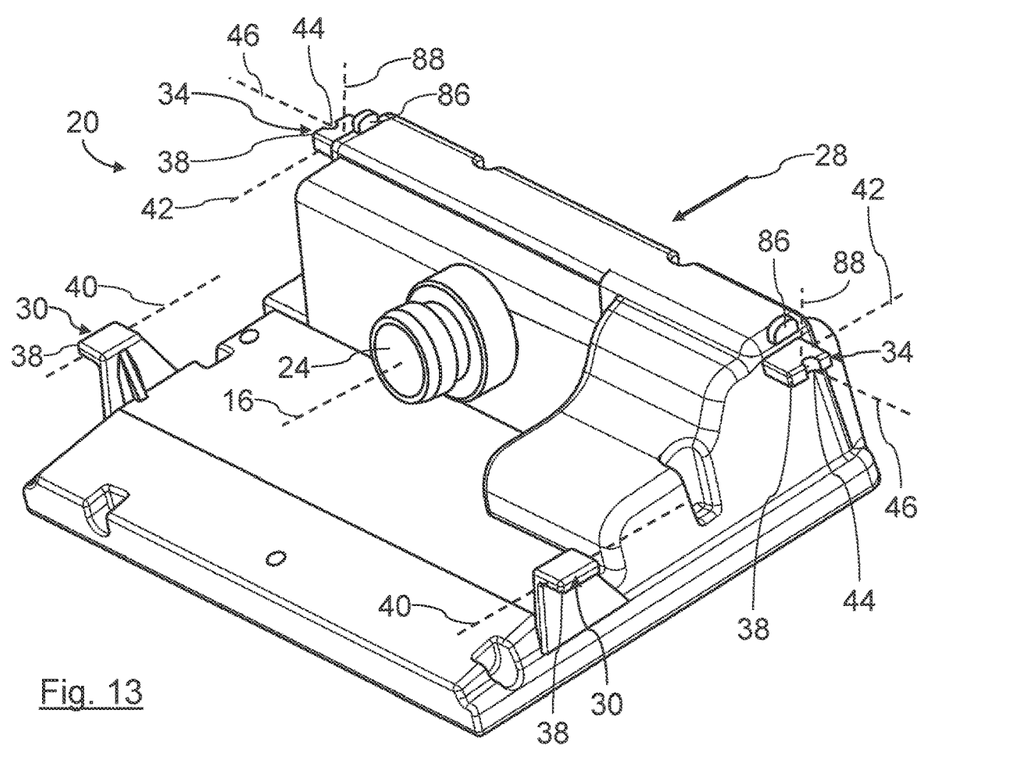
FIG. 13 is an isometric view of the camera housing of the camera system from FIGS. 1 to 10 in an oblique front view.

The front connection elements 30 and the rear connection elements 34 are each in the form of planar connecting wings. The connection elements 30 and 34 each extend laterally outwards away from the camera housing 20. The connection elements 30 and 34 each have a lead-in chamfer 38 at the front on the respective outer faces thereof.

The front connection elements 30 extend along a respective notional front connection axis 40. The rear connection elements 34 extend along a respective rear connection axis 42. The front connection elements 30 can be inserted along the respective front connection axis 40 into the respective front retaining elements 32 in order to connect the camera housing 20 to the holder base part 22. The rear connection elements 34 can be inserted along the respective rear connection axis 42 into the respective rear retaining elements 36 in order to connect the camera housing 20 to the holder base part 22.

The connection axes 40 and 42 run parallel to one another. When viewed from the holder base part 22, or respectively a base-securing portion 50 described in greater detail further below, the front connection axes 40 run at the same height. Correspondingly, the rear connection axes 42 run at the same height. When viewed from the holder base part 22, or respectively the base-securing portion 50, with respect to the camera axis 16, the front connection elements 30 and the front connection axes 40 are arranged lower than the respective rear connection elements 34 and the rear connection axes 42. The front connection elements 30 and the rear connection elements 34 are thus arranged at different heights. In the exemplary embodiment shown, as can be seen for example in FIG. 3, the rear connection axes 42 are arranged above the camera axis 16. The front connection axes 40 are arranged underneath the camera 16. In this way, the inclination of the vehicle window 14 can be compensated in such a way that the camera axis 16 runs for example approximately parallel to the vehicle longitudinal axis 18.

The rear connection elements 34 each further have a housing-locking element 44. The housing-locking elements 44 are for example in the form of depressions. The housing-locking elements 44 are located on the outer face, facing away from the camera axis 16, of the respective rear connection element 34. The housing-locking elements 44 extend along a respective notional locking axis 46. The locking axes 46 extend transversely to the respective rear connection axes 42. Along the locking axes 46, corresponding holder-locking elements 48 on the side of the rear retaining elements 36 engage with the corresponding housing-locking elements 44 in order to lock the connection.

The holder base part 22 has a planar base-securing portion 50. The base-securing portion 50 has a V-shaped viewing opening 52 at the front for the lens 24 of the camera of the camera system 12.

On the side facing the camera housing 20, a total of four securing portions 54 protrude. The securing portions 54 are formed integrally with the holder base part 22. Each of the securing portions 54 belongs to one of the retaining elements 32 and 36.

The front retaining elements 32 are constructed and arranged symmetrically with respect to a notional plane of symmetry. The plane of symmetry extends parallel to the insertion direction 28 and by way of example perpendicularly to the extent of the base-securing portion 50. The rear retaining elements 36 are likewise constructed and arranged symmetrically with respect to the notional plane of symmetry.

The securing portions 54 are hollow. When viewed in the insertion direction 28, these portions each have an approximately U-shaped profile. The securing portions 54 are closed at the front and open at the rear. Inside the securing portions 54, the base-securing portion 50 has a through-opening.

On the sides thereof facing away from the base-securing portion 54, the front securing portions 54 each integrally merge into retaining portions 56 of the front retaining elements 32.

On the outer face which is opposite the other rear securing portions 54 in each case, the rear securing portions 54 each integrally merge into lateral retaining portions 58, and on the front, merge into stops 60. The lateral retaining portions 58 and the stops 60 are each part of the respective rear retaining elements 36.

The retaining portions 56 of the front retaining elements 32 each have a lateral region 62 which is located on the side opposite the other front retaining element 32 in each case, a front region which serves as a stop 64, and a lower region 66. The lateral region 62, the stop 64, the lower region 66 and the corresponding securing portion 54 define a front insertion region 68 of the corresponding front retaining element 32. On the side opposite the lateral region 62 and the stop 64 in each case, the front insertion region 68 is open.

Furthermore, the front retaining elements 32 each have a guide web 70 which extends along the corresponding front connection axis 40 from the respective securing portion 54 into the front insertion region 68.

Moreover, a lateral guide element 72 is arranged internally on the lateral region 62, which element extends in the direction of the locking axis 46 into the front insertion region 68.

The respective front connection elements 30 can be inserted along the respective front connection axes 40 into the front insertion regions 68.

The lateral retaining portions 58 of the rear retaining elements 36 merge at the top in each case integrally into the corresponding securing portion 54, and at the bottom integrally into a lateral region 74. The lateral region 74 merges integrally into a lower region 76.

The lateral region 74, the lower region 76, the stop 60 and the securing portion 54 of a rear retaining element 36 define a respective rear insertion region 78. On the side opposite the lateral region 74 and on the rear side opposite the stop 60, the rear insertion region 78 is open.

Furthermore, the lateral retaining portions 58 of the rear retaining elements 36 each have a holder-locking element 48 on the inner face thereof facing the other rear retaining element 36 in each case. The holder-locking elements 48 are for example protrusions. The holder-locking elements 48 each extend along the corresponding locking axis 46 transversely to the corresponding rear connection axis 42 into the corresponding rear insertion region 78.

In each case, a separating slot 80 is provided between the stop 60 and the rear lateral retaining portion 58 of the rear retaining elements 36. The lateral retaining portion 28 can thus be elastically bent outwards in the direction of the locking axis 46 separately from the stop 60.

Moreover, the rear retaining elements 36 each have a guide element 82 for example in the form of a guide web. The guide elements 82 are each arranged on the side of the corresponding rear insertion region 78 facing the securing portion 54. The elements are thus located on the side of the rear insertion region 78 which is opposite the respective lower region 76. The guide elements 82 each extend along the corresponding rear connection axis 42 away from the respective securing portion 54 into the rear insertion region 78. The guide elements 82 are used to guide the respective rear connection elements 34 when inserted into the corresponding rear insertion regions 78.

Furthermore, the securing portions 54 of the rear retaining elements 36 each have a pressing-over region 84 in the region of the outer surface. The transfer regions 84 are located on the side of the securing portions 54 facing the other rear retaining element 36 in each case. In the pressing-over regions 84, the securing portions 54 are elastically deformable at least on the outer surface. When the camera system 12 is mounted, the pressing-over regions 84 are pressed in by respective pressing protrusions 86 of the camera housing 20 so that a pressing-over is produced. The pressing protrusions 86 are located obliquely above the respective rear connection elements 34 on the side opposite the respective housing-locking elements 44.

To secure the camera system 12 to the vehicle window 14, the holder base part 22 is firstly secured, for example adhered, by the upper face facing away from the retaining elements 32 and 36 to the inner face of the vehicle window 15. In this process, the V-shaped viewing opening 52 is oriented in the driving direction of the motor vehicle 10.

Subsequently, the camera housing 20 is placed in such a way that the lens 24 is located on the side facing the viewing opening 52, the respective front connection elements 30 are located in front of the rear openings of the front insertion regions 68, and the respective rear connection elements 34 are located in front of the front openings of the rear insertion regions 78.

The camera housing 20 is then moved with a straight movement in the insertion direction 28 so that the front connection elements 30 slide along the respective front connection axis 40 into the respective front insertion regions 68, and the rear connection elements 34 slide along the respective rear connection axis 42 into the rear insertion regions 78. In this process, the rear connection elements 34 are each guided by means of the corresponding guide elements 82 into the rear insertion regions 78, and the front connection elements 30 are each guided by means of the corresponding guide webs 70 into the front insertion region 68.

Furthermore, the holder-locking elements 48 are pressed outwards by means of the lead-in chamfers 38 of the rear connection elements 34 in that the respective lateral retaining portions 58 of the rear retaining elements 36 are elastically bent outwards.

As soon as the camera housing 20 reaches the end position thereof, shown in FIGS. 2 to 10, on the holder base part 22, the sides of the front connection elements 30 which are at the front when viewed in the mounting direction 28 knock against the respective stops 64 of the front retaining elements 32. Moreover, the front sides of the rear connection elements 34 knock against the respective stops 60 of the rear retaining elements 36. The camera housing 20 is thus prevented from being pushed further.

Furthermore, in the end position, the holder-locking elements 48 engage with the respective housing-locking elements 44 along the respective locking axis 46 so that the respective rear lateral retaining portions 58 can release again. The locking prevents the camera housing 20 from inadvertently sliding back out of the holder base part 22.

In addition, the respective pressing protrusions 86 press against the respective pressing-over regions 84 of the rear retaining elements 36 and thus form a pressing-over. By means of the pressing-over, the locking of the rear retaining elements 36 to the rear connection elements 34 is improved.

The locking axes 46 are oriented transversely to the mounting direction 28 and thus transversely to the corresponding mounting forces for insertion and tractive forces for the extraction and release of the connection. Moreover, the locking axes 46 each run transversely to respective notional tensile axes 88 of the retaining portions 58 on the respective securing portions 54. In this way, the locking axes 46 also run transversely to the corresponding forces holding the camera housing 20 on the holder base part 22 which, at least when the vehicle 10 is stationary, are produced by gravity. In this way, forces which are required for producing and releasing the connection between the camera housing 20 and the holder base part 22, forces which are required for locking or unlocking the connection, and retaining forces, by which the camera housing 20 is held on the holder base part 22, can be decoupled and distributed more easily.

In order to release the connection, that is to say in order to separate the camera housing 20 from the holder base part 22 and thus also from the vehicle window 14, the connection elements 30 and 34 of the camera housing 20 are extracted from the retaining elements 32 and 36 of the holder base part 22 counter to the insertion region 28. For this purpose, an increased expenditure of force is firstly required in order to release the locking between the holder-locking elements 48 and the respective housing-locking elements 44. In this process, the holder base part 22 can remain on the vehicle window 14.

In one embodiment (not shown), the front retaining elements 32 can also have holder-locking elements 48. Correspondingly, the front connection elements 30 can have housing-locking elements 44.

The invention claimed is:

1. A holder base part for securing at least one camera housing to a vehicle part of a vehicle, the holder base part comprising:
at least one retaining element which has at least one securing portion, by which the at least one retaining element is directly or indirectly secured to the vehicle part, and which has at least one retaining portion to which the at least one retaining element is separably connected by at least one connection element on the side of the at least one camera housing by a sliding movement along a notional connection axis,
wherein at least one retaining portion at least contributes to defining at least one insertion region into which the at least one housing-side connection element is inserted for separable connection to the at least one retaining element,
wherein at least one retaining element has at least one holder-locking element which can interact with at least one housing-locking element on the side of the camera housing to lock a connection between the at least one retaining element and the at least one connection element, at least one holder-locking element being arranged in at least one insertion region, and
wherein the at least one retaining portion and/or the at least one holder-locking element is resiliently movable at least transversely to the connection axis.

2. The holder base part according to claim 1, wherein at least one holder-locking element extends along a notional locking axis which runs transversely to the connection axis so that in an end position of the connection, the at least one holder-locking element and the at least one housing-locking element can engage with one another along the locking axis.

3. The holder base part according to claim 1, wherein at least one holder-locking element extends along a notional locking axis which runs transversely to a notional tensile axis of the at least one retaining portion on the at least one securing portion.

4. The holder base part according to claim 1, wherein at least one holder-locking element has or consists of at least one protrusion, and/or at least one holder-locking element has or consists of at least one depression.

5. The holder base part according to claim 1, wherein at least one retaining portion laterally defines at least one insertion region when viewed in the direction of the connection axis, and/or at least one retaining portion defines at least one insertion region on the side opposite the at least one securing portion.

6. The holder base part according to claim 1, wherein at least one retaining element has at least one stop which defines the at least one insertion region when viewed in the direction of insertion of the at least one housing-side connection element into the at least one insertion region.

7. The holder base part according to claim 1, wherein at least one retaining element has at least one guide element which is arranged on the side of the at least one insertion region which faces the at least one securing portion.

8. The holder base part according to claim 1, wherein the respective securing portions of at least two retaining elements are interconnected by means of a common base-securing portion in such a way that these portions are arranged one behind the other or obliquely one behind the other when viewed in the direction of the connection axes thereof.

9. The holder base part according to claim 1, wherein the respective securing portions of least two retaining elements are interconnected by means of a common base-securing portion in such a way that the connection axes thereof run parallel to one another at the same height when viewed from the base-securing portion, and/or the respective securing portions of at least two retaining elements are interconnected by means of a common base-securing portion in such a way that the connection axes thereof run parallel to one another at different heights when viewed from the base-securing portion.

10. A camera system for a vehicle for securing, comprising:
- at least one camera housing and at least one holder base part by which the at least one camera housing is secured to a vehicle part of the vehicle,
- the at least one camera housing being able to be separably connected to the at least one holder base part by a sliding movement along a notional connection axis,
- wherein at least one holder base part has at least one retaining element as claimed in claim 1, and at least one camera housing has at least one connection element for separable connection by a sliding movement along a notional connection axis to at least one retaining element of the at least one holder base part, by which the camera housing is directly or indirectly secured to the vehicle part,
- the at least one connection element having at least one housing-locking element which interacts with at least one holder-locking element on the side of the at least one retaining element to lock the connection between the at least one connection element and the at least one retaining element, and
- wherein at least one connection element has at least one connecting wing which is inserted into an insertion region of at least one retaining element on the side of the holder base part, at least one housing-locking element being arranged on the at least one connecting wing.

11. A camera housing, comprising:
- at least one connection element for separable connection by a sliding movement along a notional connection axis to at least one retaining portion of at least one retaining element of a holder base part, by which the camera housing is directly or indirectly secured to a vehicle part of a vehicle;
- at least one connection element having at least one housing-locking element which interacts with at least one holder-locking element on the side of the at least one retaining element to lock the connection between the at least one connection element and the at least one retaining element,
- wherein at least one connection element has at least one connecting wing which is inserted into an insertion region of at least one retaining element on the side of the holder base part, at least one housing-locking element being arranged on the at least one connecting wing, and
- wherein the at least one retaining portion and/or the at least one holder-locking element is resiliently movable at least transversely to the connection axis.

12. The camera housing according to claim 11, wherein at least one housing-locking element extends along a notional locking axis which runs transversely to the connection axis of the at least one housing-side connection element into the at least one insertion region so that the at least one holder-locking element and the at least one housing-locking element engages with one another along the locking axis.

13. The camera housing according to claim 11, wherein at least one housing-locking element has or consists of at least one depression, and/or at least one housing-locking element has or consists of at least one protrusion.

14. The camera housing according to claim 11, wherein at least one connection element has at least one pressing protrusion.

15. The camera housing according to claim 11, wherein at least two connection elements are arranged on the camera housing in such a way that the connection axes thereof, when viewed from the side on which the holder base part is arranged, run parallel to one another at the same height, and/or at least two connection elements are arranged on the camera housing so that the connection axes thereof, when viewed from the side on which the holder base part is arranged, run parallel to one another at different heights.

16. A holder base part for securing at least one camera housing to a vehicle part of a vehicle, the holder base part comprising:
- at least one retaining element which has at least one securing portion, by which the at least one retaining element is directly or indirectly secured to the vehicle part, and which has at least one retaining portion to which the at least one retaining element is separably connected by at least one connection element on the side of the at least one camera housing by a sliding movement along a notional connection axis,
- wherein at least one retaining portion at least contributes to defining at least one insertion region into which the at least one housing-side connection element is inserted for separable connection to the at least one retaining element,
- wherein at least one retaining element has at least one holder-locking element which can interact with at least one housing-locking element on the side of the camera housing to lock a connection between the at least one retaining element and the at least one connection element, at least one holder-locking element being arranged in at least one insertion region, and
- wherein at least one holder-locking element has or consists of at least one protrusion, and/or at least one holder-locking element has or consists of at least one depression.

* * * * *